Nov. 3, 1964        S. A. KNIGHT        3,155,830

SELF-SEARCHING, SELF-DITHERING SERVO SYSTEM

Filed June 27, 1961

INVENTOR:
SHELDON A. KNIGHT
BY
ATTORNEYS

United States Patent Office 3,155,830
Patented Nov. 3, 1964

3,155,830
SELF-SEARCHING, SELF-DITHERING
SERVO SYSTEM
Sheldon A. Knight, Mountain View, Calif., assignor to
American Radiator & Standard Sanitary Corporation,
New York, N.Y., a corporation of Delaware
Filed June 27, 1961, Ser. No. 120,043
7 Claims. (Cl. 250—201)

This invention relates to servo control systems, and more particularly to searching and tracking systems.

In general, the system of this invention finds utility in the orientation of space vehicles relative to some desired reference. For example, the system may be used to track the horizon of the earth by an optical system in order to provide a fixed directional line of reference within the vehicle relative to the earth. Then, any desired axis of the vehicle can be compared with this fixed line in order to steer the vehicle or to correct for inadvertent deviations from a predetermined course.

In order to best explain the objects of the present invention, the invention should be considered in light of such searching and tracking systems as are now in use. FIG. 1 illustrates a simplified searching and tracking system of the general type under consideration. An opaque baffle 11 (representing space) can move up and down in the direction indicated by the arrows in front of an illuminated screen 12 (representing the earth). The edge 13 of the baffle (representing the earth's horizon) is imaged by lens 14 and mirror 15 on the apertured plate 16. Mirror 15 is adapted to be oscillated through a limited degree of rotation by an electro-mechanical actuator 17, such as a selsyn motor, which is so constituted that the angular displacement of the mirror from the neutral position is determined by the voltage applied to the actuator.

A photodetector 18 is disposed in line with the aperture 19, and the output of the photodetector is amplified by the control circuits indicated by block 20, and applied to the actuator 17. If the image of the opaque baffle falls on aperture 19, there will be no output from the photodetector and the mirror will not be displaced from its neutral position. However, if the image of the white background falls on the aperture, the photodetector will generate a voltage which is amplified and applied to the actuator 17 to cause mirror 15 to rotate. Assuming that the polarities are correct, so that the amplifier output will rotate the mirror in the direction that will move the image of the baffle edge 13 towards the aperture, the system will attempt to follow the edge of the baffle as it moves. Since the system is basically off-on, the mirror will never be at rest, but will instead oscillate continually in such a way as to make the image of the edge 13 pass back and forth across the aperture 19. Because of the inertia of the mirror 15 and actuator 17, the natural amplitude of these oscillations can be relatively large and of low frequency. In order to reduce the amplitude and increase the frequency of mirror oscillation, a relatively high frequency "dithering" voltage is applied to the actuator 17.

FIG. 2 illustrates a conventional dithered control system 20' used in the system of FIG. 1. The dither oscillator 21 supplies a relatively high-frequency small-amplitude dither signal through summing junctions 22 and 23 to the drive amplifier 24. The power-amplified dither signal is applied to the actuator 17, causing it to oscillate at the dither frequency so that the image of the baffle edge 13 passes back and forth past the aperture 19.

FIGS. 4A, 4B and 4C show the output of the photodetector 18, and therefore the signal amplifier 25 for various positions of the baffle edge 13 with respect to the null or neutral point of the dithering oscillations. As will be noted in FIG. 4B, the baffle edge 13 is positioned at the null point of the mirror oscillation so that the photodetector 18 will be alternately illuminated and darkened for equal intervals of time as the mirror dithers. FIG. 4A illustrates the effect of moving the baffle edge upwardly from the null position of the mirror oscillation. The photodetector will now be illuminated for less than half the time, thus producing an unsymmetrical square wave output. Similarly, if the baffle edge moves downwardly, as indicated in FIG. 4C, an unsymmetrical square wave will again be produced by the photodetector.

The square waves of FIGS. 4A, 4B, and 4C are passed through a filter 26 to produce a D.C. voltage which is proportional to the edge displacement from the center of dither. This voltage is then applied through the drive amplifier 24 to the actuator 17 in the proper polarity, to recenter the null dither position of mirror 15 on the baffle edge 13.

With the system as described above, there is no output from the photodetector unless the baffle edge 13 is within relatively small dither range of the mirror. Thus, if the system is initially turned on, with a dither voltage applied to the actuator 17 so that the mirror oscillates through a very limited degree, and the baffle edge is not within this range, then there will be no control voltage to the actuator causing it to seek out the baffle edge. This problem is overcome by the use of the search oscillator 27, which imposes a very low-frequency triangular-shaped signal of a proper amplitude to drive the mirror between the limits of its total range of movement. When the baffle edge appears within the dither range of the mirror, a signal from the signal amplifier 25 actuates the search switch 28 to turn off or disconnect the search oscillator 27. The system then will track the baffle edge as described above.

The above-described system has two serious limitations which the present invention overcomes. First, the control system 20' utilizes a relatively large number of parts to obtain the dithering and search oscillations necessary for operation. As may be appreciated, component weight is a highly important consideration in missile and space vehicle operation and it is highly desirable to reduce the total number of parts in a system wherever possible. Secondly, the above-described system has a severe limitation imposed by the frequency response requirements of the filter 26. Accurate steady-state tracking of the movable baffle edge 13 requires a high D.C. servo-loop gain, which in turn requires a high D.C. transmission for filter 26. On the other hand, the attenuation at the dithering frequency must be extremely high if the dithering oscillator 21 is to maintain control of the high-frequency dithering motion of the mirror. In order to meet these requirements at the low frequencies encountered, unreasonably large capacitors are usually required in the filter 26, thereby adding unduly to the weight of the system.

It is a main object of my invention to provide a control system capable of searching and dithering which has far fewer components than the systems now in use and which has greatly relaxed filter requirements.

A further object of this invention is to provide a control system that is self-dithering by correlating the elements so that the open-loop phase shift is exactly zero at the dithering frequency and is other than zero at all other frequencies.

Another object of this invention is to provide a simple self-searching feedback circuit to enable the system to perform a search when initially turned on.

Yet another object of this invention is to provide novel means for insuring the transition from search to track modes.

Other objects and advantages will become apparent in the course of the following detailed description.

In the drawings forming a part of this application, and in which like parts are designated by like reference numerals throughout the same, FIG. 1 is a diagrammatic drawing of a tracking system in which the invention finds utility;

Figure 1:
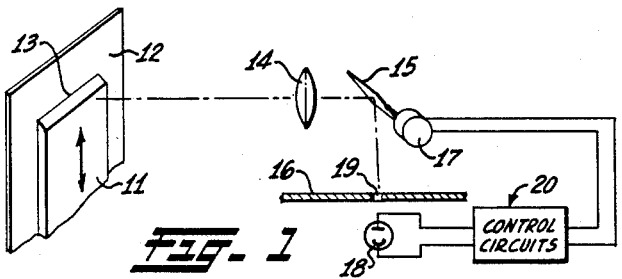
Figure 2:
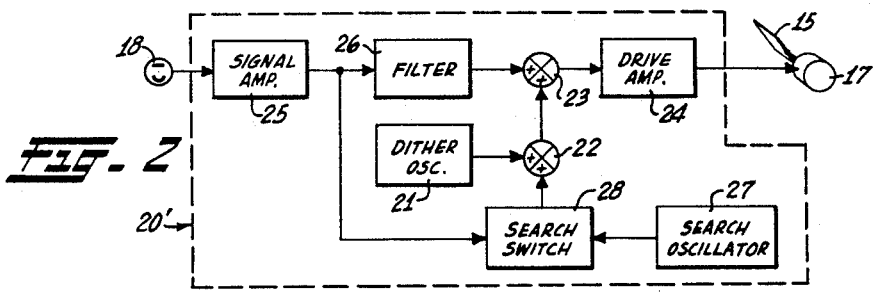
FIG. 2 is a block diagram of one form of control circuit usable in the system of FIG. 1, illustrating a method of control now in use.
Figure 3:
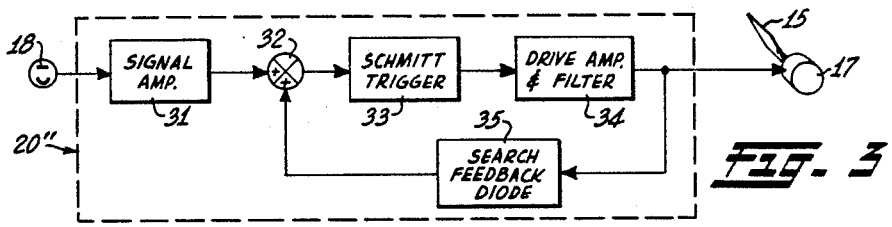
FIG. 3 is a block diagram of a control circuit usable in the system of FIG. 1 and illustrating the principles of the present invention.

The control system 20″ of the present invention, illustrated in FIG. 3, in general accomplishes the same searching and dithering functions as produced by the elements of system 20″ of FIG. 2, and comprises a signal amplifier 31, summing junction 32, bistable trigger circuit 33, drive amplifier 34 and search feed-back semiconductor diode 35.

The output signal of the photodetector is applied to and amplified by the signal amplifier 31. This amplifier is A.C. coupled and is designed in a conventional manner to have, with the photodetector as an input source, a frequency response which is essentially zero at D.C. and which rises therefrom in a controlled manner. In an operating embodiment of this invention, the frequency response of the photodetector-amplifier combination rises 6 db per octave from D.C. up to a frequency which is about ¼ of the desired dithering frequency, $W_d$. The frequency response is flat to about $W_1$ (which is approximately $W_d/2$), then rises 6 db per octave to the dithering frequency $W_d$ and then falls at 6 db per octave above $W_d$.

The output of the amplifier 31 is then applied through summing junction 32 to the input of the bistable trigger circuit 33. Preferably a Schmitt trigger circuit is used, this trigger being biased so as to remain stable in either state as long as no input is applied. The trigger output switches between plus and minus some fixed voltage, $E_0$, which voltage is applied directly to the input of the drive amplifier 34.

The drive amplifier is a conventional D.C. power amplifier designed with frequency-selective negative feedback so that the frequency response falls off relatively rapidly, starting at some low frequency. In the operating embodiment referred to above, the frequency response of the drive amplifier-actuator combination is flat from D.C. up to a low-frequency corner $W_0$ and then falls at 6 db per octave from $W_0$ to $W_1$, and then falls 12 db per octave above $W_1$. This low response to high frequencies provides sufficient attenuation of the dithering frequency component of the Schmitt trigger output so that the actuator causes the mirror to dither with the desired amplitude.

The low-frequency corner of the above described drive-amplifier-actuator combination is given by:

$$W_0 = \frac{R}{A_0 E_0 K}$$

where:

$W_0$ = low-frequency corner in radians/sec.
$R$ = search rate in radians/sec.
$A_0$ = drive amplifier D.C. voltage gain
$E_0$ = Schmitt peak output voltage
$K$ = constant relating drive amplifier-output voltage to actuator-angular position.

During the search mode of the system the drive amplifier 34 will be operating at a search frequency higher than the low frequency corner thereof and will act as an integrating circuit of the square wave output of the Schmitt trigger. The integral of a square wave is a triangular wave which is then applied to the actuator 17 causing the mirror to be progressively driven in the desired direction.

The gain of the drive amplifier-actuator, $A_D$, at the dither frequency (which determines the amplitude of mirror dithering) is given by:

$$A_D = \frac{\theta_D}{4 K E_0}$$

where:

$\theta_D$ = desired peak dither, radians
$K$ = constant relating drive amplifier-actuator output voltage to actuator angular position
$E_0$ = Schmitt peak output voltage The required D.C. gain in the drive amplifier-actuator combination, necessary for tracking, is given by:

$$K_0 \geq \frac{\theta_m \theta_D}{4 \theta_e E_0}$$

where:

$K_0$ = required D.C. gain, radians per volt
$\theta_m$ = maximum required actuator displacement from null, radians
$\theta_D$ = desired peak dither, radians
$\theta_e$ = allowable tracking error, radians
$E_0$ = Schmitt peak output voltage

*Operation*

Let it be assured that the baffle edge 13 is not within the search range of the mirror 15 at all. When power is applied, the Schmitt trigger 33 will supply either plus or minus $E_0$ volts to the input of the drive amplifier 34. Because of its frequency-response characteristics, the drive amplifier behaves as an integrator, producing a linear search motion of the mirror.

As the mirror approaches the end of its search range, the search feedback diode 35 will conduct, either in the reverse direction by Zener action, or in the forward direction, depending on which direction the initial search began. In either event, the polarity will be correct to cause the Schmitt trigger to change state. The input to the drive amplifier will then be reversed, causing the actuator to reverse the direction of mirror movement so that it moves linearly in the other direction.

If the edge 13 never appears in the search range, the above reversing operations will continue indefinitely. As may be seen, the search frequency is dependent upon the slope of the integrated square wave, and the amplitude of search movement depends on the forward and reverse conduction voltages of the search feedback diode and the voltage-to-angular-movement characteristics of the actuator 17.

If the edge 13 should now appear in the field of search, the mirror will cause the edge to cross the aperture 19. If the edge crossing is in the proper direction, the photodetector, through the signal amplifier, will produce a pulse of the right polarity to reverse the trigger 33. An edge crossing in the wrong direction, of course, would not reverse the trigger, since the polarity of this signal would be trying to force the trigger into the state in which it is already.

When the trigger reverses, the mirror does not start moving in the opposite direction immediately, but instead, it lags slightly, due to the low pass filter action of the drive amplifier together with the dynamics and inertia of the actuator. The mirror will continue past the edge a short distance, turn around, and then recross the edge. Since the signal amplifier 31 is A.C. coupled, the D.C. signal produced by the first crossing will decay before the recrossing. The recrossing then again produces a pulse of the right polarity to drive the Schmitt trigger through its dead zone and into the opposite state to initiate the tracking mode.

As is apparent, it is highly important in insuring the proper transition between the searching and tracking modes that the signal amplifier have a low response to low frequencies in order that the signal produced by the first crossing will decay and allow the Schmitt trigger to be retriggered into the opposite state. This can be obtained by setting the time constant of the coupling circuit in the signal amplifier so that it is comparable to the time lag between crossing and recrossing of the edge.

The dithering frequency is set by correlating the drive amplifier 34, actuator 17, photodetector and signal amplifier so that the open-loop phase shift of the circuit is exactly zero degrees at the desired dithering frequency $W_d$, and is less or greater than zero for frequencies below and above the desired dither frequency, respectively. To define the expression "open-loop phase shift" as used in this application, consider that the line connecting signal amplifier 31 and summing junction 32 is disconnected and a sine wave oscillator (not shown) is connected to the input of the summing junction 32 to drive Schmitt trigger 33. The mirror 15 will then be dithered at the sine wave oscillator frequency. If the baffle edge 13 is within the dithering range of the mirror, then its image will sweep back and forth across aperture 19 and an output voltage will be developed from the signal amplifier. The open-loop phase shift is defined as the phase of the fundamental component of the signal amplifier 31 output relative to the phase of the output of the sine wave oscillator which is connected to the input of the summing junction 32.

When the image of edge 13 crosses the aperture 19 at a frequency in which the open-loop phase shift of the system is zero degrees, the output of the photodetector and signal amplifier will be applied to the Schmitt trigger in such phase as to cause the mirror movement to be reinforced, resulting in self-oscillation or self-dithering of the system.

The relatively low response of the drive amplifier at the dithering frequency attenuates the dithering component of the Schmitt trigger output sufficiently so that the dithering signal applied to the actuator will not be of such magnitude that the mirror is rotated with undue amplitude.

The amplitude of the Schmitt trigger output is, of course, independent of the photodetector-signal amplifier output and therefore the dither amplitude is also independent of the photodetector signal amplifier amplitude. The dither amplitude is determined solely by the gain at the dither frequency of the drive amplifier, along with the voltage-angle relationship of the actuator 17. This feature permits easy adjustment of the dither amplitude without affecting the servo characteristics of the system, and vice versa.

Figure 4:
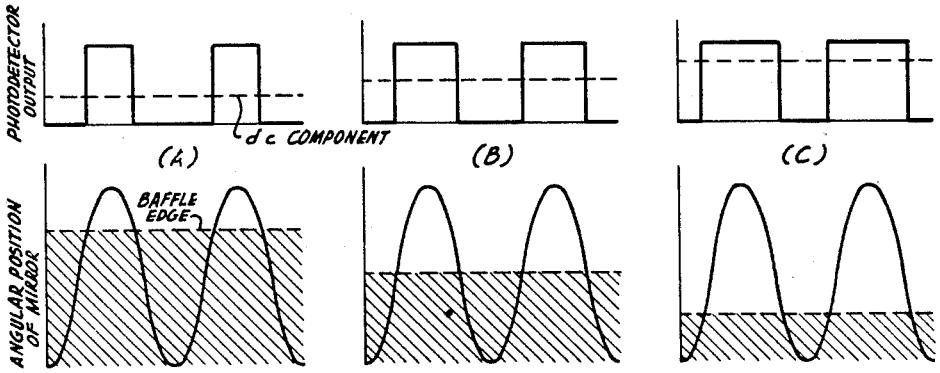
FIGS. 4A, 4B and 4C illustrate the photodetector output and D.C. component thereof for different positions of the baffle edge relative to the null point of the dithering movement of the mirror.

The symmetry of the square wave produced by the Schmitt trigger follows the square wave of the photodetector and thus enables the system to follow edge movement, as previously discussed in connection with FIG. 4. If the edge should move from the center of the dither, then the Schmitt output will contain a D.C. component of the proper polarity to maintain tracking.

The tracking accuracy of the system is determined by the D.C.-loop gain, including the scale factor between displacement of the edge from the dither center and the D.C. component of the Schmitt output.

Although the zero-degree open-loop phase shift at the dithering frequency of the particular embodiment described herein has been achieved by correlating the components of the signal amplifier so that its frequency response peaks at the dithering frequency, it is to be realized that other ways of achieving the designed open-loop phase shift can be utilized. For example, the frequency response of the drive amplifier could be peaked at the dithering frequency which would give the zero phase shift at the dithering frequency necessary for self-oscillation and self-dithering. That is, the essential requirement for self-oscillation in the present invention is that the components be correlated to produce a zero-degree open-loop phase shift, which requirement may be met by designing and setting the characteristics of the various elements in the loop in known ways to achieve such a phase shift.

The system described above has been specifically illustrated as being operated by variations in "light." However, it is to be realized that the mirror and photodetector system may be used to detect variations in radiant energy other than visible light, such as infra-red or ultra-violet radiation. Thus, as long as the detector 18 is of such type that will have a photovoltaic response to the impingement of radiant energy thereon, the searching and tracking system of this invention can be used without any change in principle of operation.

It is to be further understood that the form of this invention herein shown and described is to be taken as a preferred embodiment of the same and that various changes may be made in the components and arrangements thereof without departing from the spirit of the invention or the scope of the attached claims.

Having thus described the invention, what is claimed is:

1. In a self-dithering, self-searching servo system, including transducing means for converting variations of radiant energy into variations of electrical voltages, an oscillatable optical scanning means for directing variations of radiant energy to said transducing means, and actuator means for oscillating said optical scanning means in response to electrical voltages applied to said actuator means, the improvement comprising: a signal-amplifier means having its input connected to the output of said transducing means; a bistable trigger circuit having its input connected to the output of said signal amplifier means; and a drive-amplifier means having its input connected to the output of said trigger circuit and its output connected to the input of said actuator means; and in which the open-loop phase shift produced by said drive-amplifier means, actuator means, transducing means and signal-amplifier means is exactly zero at the dithering frequency $W_d$, and is other than zero degrees at frequencies below and above the dithering frequency.

2. A self-dithering, self-searching servo system comprising: transducing means for converting variations of radiant energy into variations of electrical voltages; an oscillatable optical scanning means for directing variations of radiant energy to said transducing means; actuator means for oscillating said optical scanning means in response to electrical voltages applied to said actuator means; a signal-amplifier means having its input connected to the output of said transducing means; a bistable trigger circuit having its input connected to the output of said signal amplifier means; and a drive-amplifier means having its input connected to the output of said trigger circuit and its output connected to the input of said actuator means; and in which the open-loop phase shift produced by said drive-amplifier means, actuator means, transducing means and signal-amplifier means is exactly zero at the dithering frequency $W_d$, is greater than zero below the dithering frequency and is less than zero above the dithering frequency.

3. A self-dithering, self-searching servo system comprising: transducing means for converting variations of radiant energy into variations of electrical voltages; an oscillatable optical scanning means for directing variations of radiant energy to said transducing means; actuator means for oscillating said optical scanning means in response to electrical voltages applied to said actuator means; a signal-amplifier means having its input connected to the output of said transducing means; a bistable trigger circuit having its input connected to the output of said signal-amplifier means; a drive-amplifier means having its input connected to the output of said trigger circuit and its output connected to the input of said actuator means; and a semi-conductor diode means connected between the output of said drive amplifier means and the input of said trigger circuit for conduction in forward or reverse directions upon the application of predetermined positive or negative potential differences thereacross; in which the open-loop phase shift produced by said drive-amplifier means, actuator means, transducing means and signal-amplifier means is exactly zero at the desired dithering frequency $W_d$, and is other than zero below and above the dithering frequency.

4. In a self-dithering, self-searching servo system including transducing means for converting variations of radiant energy into variations of electrical voltages, an oscillatable optical scanning means for directing variations of radiant energy to said transducing means, and actuator means for oscillating said optical scanning means in response to electrical voltages applied to said actuator means, the improvement comprising a signal-amplifier means having its input connected to the output of said transducing means; a bistable trigger circuit having its input connected to the output of said signal-amplifier means; a drive-amplifier means having its input connected to the output of said trigger circuit and its output connected to the input of said actuator means; and a diode means connected between the output of said drive amplifier means and the input of said trigger circuit for conduction in forward or reverse directions upon the application of predetermined positive or negative potential differences thereacross; said signal-amplifier means having a frequency response which is essentially zero at zero frequency; said drive-amplifier means having a frequency response which is flat from zero frequency to the low frequency corner $W_0$ of the drive amplifier-actuator combination; and in which $W_0$ is equal to $$\frac{R}{A_0 E_0 K}$$

wherein $R$=search rate in radians per second, $A_0$=drive-amplifier D.C. voltage gain, $K$=constant relating drive-amplifier-output voltage to actuator means angular position, and $E_0$=the trigger circuit output peak voltage.

5. A self-dithering, self-searching servo system comprising: transducing means for converting variations of radiant energy into variations of electrical voltages; an oscillatable optical scanning means for directing variations of radiant energy to said transducing means; actuator means for oscillating said optical scanning means in response to electrical voltages applied to said actuator means; a signal-amplifier means having its input connected to the output of said transducing means; a bistable trigger circuit having its input connected to the output of said signal-amplifier means, a drive-amplifier means having its input connected to the output of said trigger circuit and its output connected to the input of said actuator means; and a diode means connected between the output of said drive-amplifier means and the input of said trigger circuit for conduction in forward or reverse directions upon the application of predetermined positive or negative potential differences thereacross; said signal-amplifier means having a frequency response which is essentially zero at zero frequency; said drive amplifier means having a frequency response which is flat from zero frequency to the low-frequency corner $W_0$ of the drive-amplifier-actuator combination, and in which $W_0$ is equal to $$\frac{R}{A_0 E_0 K}$$

wherein $R$=search rate in radians per second, $A_0$=drive-amplifier D.C. voltage gain, $K$=constant relating drive-amplifier output voltage to actuator means angular position, and $E_0$=the trigger circuit output peak voltage.

6. In a self-dithering, self-searching servo system including transducing means for converting variations of radiant energy into variations of electrical voltages, an oscillatable optical scanning means for directing variations of radiant energy to said transducing means, and actuator means for oscillating said optical scanning means in response to electrical voltages applied to said actuator means, the improvement comprising a signal amplifier means having its input connected to the output of said transducing means; a bistable trigger circuit having its input connected to the output of said signal amplifier means; a drive amplifier means having its input connected to the output of said trigger circuit and its output connected to the input of said actuator means; a semiconductor diode means connected between the output of said drive amplifier means and the input of said trigger circuit for conduction in forward or reverse directions upon the application of predetermined positive or negative potential differences thereacross; said signal amplifier means being A.C. coupled and having a frequency response which is essentially zero frequency; said drive amplifier means having a frequency response which is flat from zero frequency to some frequency $W_0$ substantially less than the dithering frequency $W_d$ and then decreases from $W_0$ to $W_d$; in which the low-frequency corner $W_0$ of said drive amplifier-actuator combination is equal to $$\frac{R}{A_0 E_0 K}$$

wherein $R$=search rate in radians per second, $A_0$=drive-amplifier D.C. voltage gain, $K$=constant relating drive-amplifier output voltage to actuator means angular position, and $E_0$=trigger circuit output peak voltage; and in which the open-loop phase shift produced by said drive-amplifier means, actuator means, transducing means and signal-amplifier means is exactly zero at the dithering frequency $W_d$, and is other than zero below and above the dithering frequency.

7. A self-dithering, self-searching servo system comprising: transducing means for converting variations of radiant energy into variations of electrical voltages; an oscillatable optical scanning means for directing variations of radiant energy to said transducing means; actuator means for oscillating said optical scanning means in response to electrical voltages applied to said actuator means; a signal amplifier means having its input connected to the output of said transducing means; a bistable trigger circuit having its input connected to the output of said signal-amplifier means; a drive-amplifier means having its input connected to the output of said trigger circuit and its output connected to the input of said actuator means; a semi-conductor diode means connected between the output of said drive amplifier means and the input of said trigger circuit for conduction in forward or reverse directions upon the application of predetermined positive or negative potential differences thereacross; said signal amplifier means being A.C. coupled and having a frequency response which rises from zero frequency to a predetermined frequency $W_2$, is flat between frequencies $W_2$ and $W_1$ and which then rises and peaks at the desired dithering frequency $W_d$, and in which $W_1$ is less than $W_d$ and greater than $W_2$; said drive-amplifier means having a frequency response which is flat from zero frequency to some frequency $W_0$ substantially less than the dithering frequency $W_d$ and then decreases from $W_0$ to $W_d$; in which the low-frequency corner $W_0$ of said drive amplifier-actuator combination is equal to $$\frac{R}{A_0 E_0 K}$$

wherein $R$=search rate in radians per second, $A_0$=drive-amplifier D.C. voltage gain, $K$=constant relating drive-amplifier output voltage to actuator means angular position, and $E_0$=the trigger circuit output peak voltage; and in which the open-loop phase shift produced by said drive-amplifier means, actuator means, transducing means and signal-amplifier means is exactly zero at the dithering frequency $W_d$, and is other than zero below and above the dithering frequency.

References Cited in the file of this patent

UNITED STATES PATENTS

| | | |
|---|---|---|
| 2,828,930 | Herbold | Apr. 1, 1958 |
| 2,916,632 | Peterson | Dec. 8, 1959 |
| 2,949,536 | Langston | Aug. 16, 1960 |
| 2,999,161 | Lovoff | Sept. 5, 1961 |
| 3,020,407 | Merlin | Feb. 6, 1962 |